United States Patent [19]

Hechenberger et al.

[11] Patent Number: 4,997,861

[45] Date of Patent: Mar. 5, 1991

[54] ADHESIVE

[75] Inventors: Dieter A. Hechenberger; Aurelia A. Liar, both of Buehl, Fed. Rep. of Germany

[73] Assignee: Linger & Fischer GmbH, Fed. Rep. of Germany

[21] Appl. No.: 284,083

[22] Filed: Dec. 14, 1988

[30] Foreign Application Priority Data

Dec. 14, 1987 [GB] United Kingdom ................ 8729140

[51] Int. Cl.$^5$ ........................................... C09J 133/22
[52] U.S. Cl. ..................................... 523/176; 524/533
[58] Field of Search ........................ 523/176; 524/533

[56] References Cited

U.S. PATENT DOCUMENTS 4,038,345  7/1977  O'Sullivan et al.
4,477,607  10/1984  Litke ................................... 523/212
4,845,151  7/1989  Sivy ..................................... 523/176

FOREIGN PATENT DOCUMENTS 0151527  8/1985  European Pat. Off. ............ 523/176
0209067  1/1987  European Pat. Off. ............ 523/176
0229367  7/1987  European Pat. Off. ............ 523/176
1261281  1/1972  United Kingdom .
2129003  5/1984  United Kingdom ............... 523/176

Primary Examiner—C. Warren Ivy
Attorney, Agent, or Firm—Jacobs & Jacobs

[57] ABSTRACT

An adhesive composition, of the 'instant adhesive' type, comprising:
  (a) from 77 to 95% by weight of monomeric 2'-ethoxyethyl 2-cyanoacrylate;
  (b) from 3 to 15% by weight of a poly-($C_{1-5}$) alkyl acrylate or methacrylate having an average molecular weight within the range of from 400,000 to 600,000;
  (c) from 2 to 8% by weight of hydrophobic fumed silica; and
  (d) from 100 to 1000 ppm by weight of a polymerization stabilizer;

overcomes a number of disadvantages associated with currently available 'instant adhesives' (such as high volatility, brittle adhesive bond, poor resistance to heat and unpleasant smell) and it has the advantages that it cures rapidly and can be used on porous substrates.

6 Claims, No Drawings

ADHESIVE

The present invention relates to a novel adhesive composition, and more particularly to an adhesive composition of the so-called 'instant adhesive' type.

'Instant adhesives' based on monomeric ($C_{1-5}$)alkyl 2-cyanoacrylates (such as ethyl 2-cyanoacrylate) as the adhesive component have long been commercially available. Curing of such adhesives occurs very rapidly through the action of atmospheric moisture under anaerobic conditions. There are a number of disadvantages associated with such adhesives, one of which is that they are not suitable for use with porous substrates, such as paper, cardboard, leather and wood, which is thought to result from the porous substrates being unable to provide the necessary anaerobic environment, and also from the adhesive being absorbed by the substrate.

Another disadvantage is that the adhesive bond itself exhibits a low tensile strength or impact resistance because of the brittleness of the polymer formed on curing of the adhesive. Additionally, the adhesive bond tends to soften at about 70°-80° C., which temperatures are commonly encountered, for example, in domestic dishwashing machines, thus imparting another limitation to the use of the adhesives.

A further disadvantage is that the monomeric ester has a high degree of volatilization, which causes frothy exudation from the bottle or tube as soon as it is opened. As the monomer is exuded it is deposited as a whitish layer of polymer. The monomeric ester also has a stinging, unpleasant smell, which is upsetting in both industrial and domestic use.

Attempts have previously been made to overcome the difficulties with porous substrates, especially wood, by adding an adhesion accelerator (such as a crown ether or a polyglycol ether) to a cyanoacrylate adhesive composition. One problem with this is that the presence of the adhesion accelerator and also stabilisers in the same composition gives a very precarious equilibrium, such that the adhesives have a poor storage stability.

The present invention now provides an adhesive composition comprising:

(a) from 77 to 95% by weight of monomeric 2'-ethoxyethyl 2-cyanoacrylate;
(b) from 3 to 15% by weight of a poly-($C_{1-5}$)alkyl acrylate or methacrylate having a weight average molecular weight within the range of from 400,000 to 600,000;
(c) from 2 to 8% by weight of hydrophobic fumed silica; and
(d) from 100 to 1000 ppm by weight of a polymerisation stabiliser;

all proportions being based on the total weight of components (a) to (c).

The adhesive composition of the invention overcomes a number of the disadvantages of the currently available 'instant adhesives'. The present adhesive composition cures rapidly and can be used on porous substrates. Moreover it does not exhibit the above-mentioned disadvantages of high volatility, brittle adhesive bond, poor resistance to heat and unpleasant smell.

In the adhesive composition according to the present invention, 2'-ethoxyethyl 2-cyanoacrylate is used as ($C_{1-5}$)alkyl 2-cyanoacrylate conventionally used. The cyanoacrylate ester is present in an amount of from 77 to 95% by weight, preferably from 85 to 90% by weight, based on the total weight of components (a) to (c). The cyanoacrylate ester should advantageously be of high purity, preferably about 99.5% by weight pure.

The cyanoacrylate ester is used in combination with two selected thickeners, namely a poly-($C_{1-5}$)alkyl acrylate or methacrylate having an average molecular weight within the range of from 400,000 to 600,000, and hydrophobic fumed silica.

The poly-($C_{1-5}$)alkyl (meth)acrylate is used in an amount of from 3 to 15% by weight, preferably from 6 to 10% by weight, based on the total weight of components (a) to (c). It may suitably be, for example, a polyethyl (meth)acrylate or a polymethyl (meth)acrylate. Preferably, a polymethyl methacrylate is used, and suitable polymethyl methacrylates are commercially available under the trade name 'Plexidon' M449, M489 or M527 from Roehm AG,, Darmstadt, Germany.

The hydrophobic fumed silica (also referred to as pyrogenic silica) is used in an amount of from 2 to 8% by weight, preferably from 2.5 to 5% by weight, based on the total weight of components (a) to (c). Suitable hydrophobic fumed silicas for use in the present adhesive compositions are commercially available under the trade names 'Aerosil' R802, R812, or R972 from Degussa, Frankfurt, Germany, 'HDK' H15 or H20 from Waker-Chemie GmbH, Munich, Germany, and 'Cabosil' M5 from Cabot Co., U.S.A.

For example, 'Aerosil' R972 is a pyrogenic silicic acid having the following typical properties:
specific surface area 110 $m^2/g$
primary particle size 16 mm
pH value (DN 53200) 3.6–4.3

The adhesive composition according to the present invention also comprises one or more polymerisation stabilisers, as is conventional in 'instant adhesive' compositions, to prevent premature polymerisation of the cyanoacrylate. Advantageously, the adhesive composition according to the present invention includes both a stabiliser against radical polymerisation and a stabiliser against anionic polymerisation, each of which may suitably be present in an amount of from 100 to 500 ppm by weight, all amounts (ppm=parts per million) being based on the total weight of components (a) to (c).

Stabilisers suitable for use in the present compositions are those currently used or suitable for use in commercially available instant adhesives based on cyanoacrylates. Such stabilisers include, for example, hydroquinone (which stabilises against radical polymerisation of the cyanoacrylate), and acidic stabilisers, for example phosphorus pentoxide (or phosphoric acid) and p-toluenesulphonic acid (both of which stabilise against anionic polymerisation of the cyanoacrylate). A suitable stabiliser mixture for use in the present adhesive compositions comprises from 100 to 500 ppm (preferably about 200 ppm) by weight of hydroquinone and from 100 to 500 ppm (preferably about 300 ppm) by weight of phosphorus pentoxide. Other acidic stabiliser mixtures may, however, be used.

The adhesive composition according to the invention advantageously has a viscosity within the range of from 50 to 800 poise, preferably from 80 to 150 poise. Thus the composition has a thickish consistency, like a gel.

Surprisingly, the combination of a selected cyanoacrylate with two selected thickeners, in the given amounts, in the adhesive composition according to the present invention gives good adhesion to porous substrates. This is achieved without the need to incorporate an alkaline adhesion accelerator and consequently the present adhesive composition does not have reduced storage stability. Indeed, the present composition has good storage stability, combined with the other advantages mentioned previously.

The adhesive composition according to the invention can be used to advantage for any purpose where at least one of the substrate surfaces to be adhered together is porous, such as paper, cardboard, leather, wood, pottery and porcelain. Adhesion of wood substrates is of particular practical importance. The adhesive composition can however also be used for smooth and non-porous substrates.

Because of its viscosity, the adhesive composition according to the invention can easily be applied to inclined or vertical surfaces without risk of rippling or running. It can also successfully be used to adhere uneven substrates and to fill small gaps and indentations in or between the substrates to be joined.

In the preparation of the adhesive composition according to the invention, it is advantageous L(-) initially to ensure that the 2'-ethoxyethyl 2-cyanoacrylate is of sufficient purity, as discussed above, and also to test its stability, for example by maintaining it at at least 80° C. for at least 7 days.

Additionally, the polyalkyl (meth)acrylate should advantageously be thoroughly dried by heating under low vacuum. This ensures that all moisture and peroxide, either of which could cause premature curing, are removed. Advantageously, the low vacuum should be maintained until shortly before (e.g. not more than 5 min before) the polyalkyl (meth)acrylate is mixed with the other components.

In general, all components should, of course, be used dry.

The adhesive composition may be prepared by first adding the acidic stabiliser(s) to the monomeric cyanoacrylate, with stirring, followed by addition of the dried, peroxide-free polyalkyl (meth)acrylate, after which the mixture is heated to not more than 80° C., and then allowed to cool, with constant stirring, to room temperature. Thereafter, the hydrophobic fumed silica is added to the cooled mixture with brief stirring.

The examples summarised in the following table illustrate the invention. In each example, the adhesive composition was prepared using the procedure outlined above. The table gives the proportions of the various components (in % w/w) and the viscosity (in poise) of the resulting composition. All compositions were stable for more than 7 days at 80° C.

TABLE

| EXAMPLE | 1 | 2 | 3 | 4 | 5 | 6 |
|---|---|---|---|---|---|---|
| 2'-ethoxyethyl 2-cyanoacrylate | 82.95 | 88.95 | 94.95 | 77.05 | 88.00 | 89.50 |
| polymethyl methacrylate (Plexidon M449) | 15.00 | 3.00 | 3.00 | 15.00 | 9.00 | 8.00 |
| fumed silica (Aerosil R972) | 2.00 | 8.00 | 2.00 | 7.90 | 3.00 | 2.50 |
| phosphorus pentoxide | 0.03 | 0.03 | 0.03 | 0.03 | 0.03 | 0.03 |
| hydroquinone | 0.02 | 0.02 | 0.02 | 0.02 | 0.02 | 0.02 |
| Viscosity (P) | 600 | 200 | 50 | 800 | 180 | 120 |

We claim:

1. An adhesive composition consisting essentially of:
   (a) from 77 to 95% by weight of monomeric 2'-ethyoxyethyl 2-cyanoacrylate;
   (b) from 3 to 15% by weight of a poly-($C_{1-5}$)alkyl acrylate or methacrylate having a weight average molecular weight within the range of from 400,000 to 600,000;
   (c) from 2 to 8% by weight of hydrophobic fumed silica; and
   (d) from 100 to 1000 ppm by weight of a polymerisation stabiliser;
all proportions being based on the total weight of components (a) to (c).

2. An adhesive composition as claimed in claim 1, having a viscosity within the range of from 80 to 80 poise.

3. An adhesive composition as claimed in claim 2, having a viscosity within the range of from 80 to 150 poise.

4. An adhesive composition consisting of:
   (a) from 77 to 95% by weight of monomeric 2'-ethyoxyethyl 2-cyanoacrylate;
   (b) from 3 to 15% by weight of a poly-($C_{1-5}$)alkyl acrylate or methacrylate having a weight average molecular weight within the range of from 400,000 to 600,000;
   (c) from 2 to 8% by weight of hydrophobic fumed silica; and
   (d) from 100 to 1000 ppm by weight of a polymerisation stabiliser;
all proportions being based on the total weight of components (a) to (c).

5. An adhesive composition as claimed in claim 4, having a viscosity within the range of from 50 to 800 poise.

6. An adhesive composition as claimed in claim 5, having a viscosity within the range of from 80 to 150 poise.

* * * * *